(12) United States Patent
Mabe et al.

(10) Patent No.: US 10,422,388 B2
(45) Date of Patent: Sep. 24, 2019

(54) PROPELLER SHAFT

(71) Applicant: HITACHI AUTOMOTIVE SYSTEMS, LTD., Hitachinaka-shi, Ibaraki (JP)

(72) Inventors: Yasutomo Mabe, Zama (JP); Kenichi Sugiyama, Atsugi (JP); Daiki Tsutsumi, West Bloomfield, MI (US)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 210 days.

(21) Appl. No.: 15/487,576

(22) Filed: Apr. 14, 2017

(65) Prior Publication Data

US 2017/0298993 A1    Oct. 19, 2017

(30) Foreign Application Priority Data

Apr. 18, 2016   (JP) ................................. 2016-082561

(51) Int. Cl.
  *F16D 1/116*    (2006.01)
  *F16D 3/223*    (2011.01)
  *F16D 1/10*     (2006.01)

(52) U.S. Cl.
  CPC .............. *F16D 1/116* (2013.01); *F16D 3/223* (2013.01); *F16D 2001/103* (2013.01); *F16D 2003/22313* (2013.01); *F16D 2003/22326* (2013.01)

(58) Field of Classification Search
  CPC ...... F16D 2001/103; F16D 1/06; F16D 1/108; F16D 1/116; F16D 2003/22313; F16D 2003/22326; F16B 21/18; F16B 21/183; Y10T 403/7033; F16L 37/088
  See application file for complete search history.

(56) References Cited

U.S. PATENT DOCUMENTS

| 5,499,884 A | * | 3/1996 | Kuhnhold | ............... F16B 21/18 403/326 |
| 5,643,092 A | * | 7/1997 | Girguis | ................. F16D 3/2237 403/359.5 |
| 6,019,399 A | * | 2/2000 | Sweeney | ............. F16L 25/0036 285/248 |

(Continued)

FOREIGN PATENT DOCUMENTS

| DE | 102014200745 A1 | * | 7/2015 | ............ F16L 37/088 |
| FR | 2179471 A5 | * | 11/1973 | ............ F16B 21/186 |

(Continued)

*Primary Examiner* — Matthieu F Setliff
(74) *Attorney, Agent, or Firm* — Foley & Lardner LLP

(57) ABSTRACT

A propeller shaft includes a shaft section connected between an input shaft and an output shaft via respective constant velocity joints, wherein the input shaft is connected to a drive source of a vehicle, and the output shaft is connected to driving wheels. The constant velocity joint includes a circlip-restricting surface to engage with a circlip provided in an outer peripheral surface of the input or output shaft, for restricting movement of the first or second shaft in an axial direction. The circlip-restricting surface is implemented by a first inclined surface and a second inclined surface, wherein the second inclined surface is closer to a rotational axis of the shaft section, and wherein the first inclined surface has an acute angle with respect to the axial direction, and the second inclined surface has a smaller angle with respect to the axial direction.

10 Claims, 9 Drawing Sheets

(56) References Cited

U.S. PATENT DOCUMENTS

| | | | |
|---|---|---|---|
| 6,866,064 B2* | 3/2005 | Nanni, Jr. | F16L 37/088 137/15.09 |
| 6,926,460 B2* | 8/2005 | Yamamoto | B62D 55/21 305/204 |
| 7,364,207 B2* | 4/2008 | McGee | F16L 19/0206 285/321 |
| 7,481,711 B2* | 1/2009 | Fukumura | F16D 3/223 403/359.5 |
| 7,614,818 B2* | 11/2009 | Gutierrez | F16B 21/18 403/319 |
| 7,631,905 B2* | 12/2009 | McGee | F16L 37/088 285/321 |
| 8,864,591 B2 | 10/2014 | Sugiyama et al. | |
| 2002/0131817 A1* | 9/2002 | Yamamoto | B62D 55/21 403/272 |
| 2004/0103946 A1* | 6/2004 | Nanni, Jr. | F16L 37/088 137/614.03 |
| 2006/0108793 A1* | 5/2006 | McGee | F16L 19/0206 285/148.2 |
| 2006/0188328 A1* | 8/2006 | Gutierrez | F16B 21/18 403/359.1 |
| 2006/0211505 A1* | 9/2006 | Fukumura | F16D 3/223 464/182 |
| 2008/0174111 A1* | 7/2008 | McGee | F16L 19/0206 285/148.2 |
| 2013/0252746 A1* | 9/2013 | Sugiyama | F16C 1/04 464/141 |
| 2014/0334873 A1* | 11/2014 | Sugiyama | F16C 1/04 403/359.5 |

FOREIGN PATENT DOCUMENTS

| | | | |
|---|---|---|---|
| JP | 2013-194895 A | 9/2013 | |
| WO | WO-9211466 A1 * | 7/1992 | F16B 21/18 |
| WO | WO-2007055685 A1 * | 5/2007 | F16D 1/116 |

* cited by examiner

PROPELLER SHAFT

BACKGROUND OF THE INVENTION

The present invention relates to a propeller shaft applicable to an automotive vehicle and others.

Japanese Patent Application Publication No. 2013-194895 (JP 2013-194895 A), corresponding to U.S. Pat. No. 8,864,591 B2, discloses a propeller shaft for transmitting rotation from a drive source of a vehicle to driving wheels of the vehicle. The propeller shaft includes a shaft section extending in a vehicle longitudinal direction. The shaft section is connected at its first longitudinal end to a first shaft via a first constant velocity joint, and connected at its second longitudinal end to a second shaft via a second constant velocity joint, wherein the first shaft is connected to the drive source, and the second shaft is connected to the driving wheels.

Each constant velocity joint includes an outer ring member, an inner ring member, and a plurality of balls. The shaft section is provided with the outer ring member, wherein the outer ring member has a tubular shape. The inner ring member has a tubular shape, and is disposed radially inside the outer ring member. The balls are disposed between the outer ring member and the inner ring member for transmitting a torque therebetween. The inner ring member includes a female spline part, which is formed in an inner peripheral side of the inner ring member, and configured to engage with a male spline part formed in an outer peripheral side of the first or second shaft. The inner ring member includes a female-spline-side annular groove, which is formed and extending circumferentially in the inner peripheral side of the inner ring member, and is defined by a first side wall, a second side wall, and a bottom wall between the first side wall and the second side wall, wherein the second side wall is closer to the shaft section than the first side wall. The female-spline-side annular groove is configured to receive a circlip, wherein the circlip is disposed in a male-spline-side annular groove formed and extending circumferentially in the outer peripheral side of the first or second shaft, and configured to expand into the female-spline-side annular groove, to restrict movement of the first or second shaft in the axial direction of the shaft section with respect to the inner ring member. A circlip-restricting surface is formed in the first side wall of the female-spline-side annular groove. The circlip-restricting surface is formed as an inclined surface having a large angle with respect to the axial direction of the shaft section for ensuring a force restricting movement of the circlip in the axial direction of the shaft section.

SUMMARY OF THE INVENTION

In the propeller shaft of JP 2013-194895 A, the configuration that the circlip-restricting surface has the large angle with respect to the axial direction of the shaft section, results in that a component of a reaction force in a radial direction of the shaft section against a pulling-out load applied to the first or second shaft is small with respect to the pulling-out load, wherein the component of the reaction force serves to compress the circlip in the radial direction. This requires the pulling-out load to be large when the first or second shaft is pulled out from the inner ring member for maintenance or the like, and thereby adversely affects the efficiency of pulling-out operation.

On the other hand, if the angle of the circlip-restricting surface with respect to the axial direction of the shaft section is set smaller for making it easy to pull out the first or second shaft from the inner ring member, the first or second shaft may be detached unintentionally during the propeller shaft is in use.

In view of the foregoing, it is desirable to provide a propeller shaft which satisfies at least two requirements simultaneously, wherein a first requirement is to prevent detachment of a first or second shaft when in use, and a second requirement is to reduce a load of pulling out the first or second shaft when in detaching operation.

According to one aspect of the present invention, a propeller shaft for transmitting rotation between a drive source of a vehicle and a driving wheel of the vehicle, comprises: a shaft section configured to be connected between a first shaft and a second shaft, wherein the first shaft is configured to be connected to the drive source, and wherein the second shaft is configured to be connected to the driving wheel; an outer ring member and an inner ring member, wherein the shaft section is provided with one of the outer ring member and the inner ring member as a first ring member, wherein the outer ring member has a tubular shape, wherein the inner ring member has a tubular shape, and wherein the inner ring member is disposed radially inside the outer ring member; a plurality of balls disposed between the outer ring member and the inner ring member; outer-ring-side engaging grooves formed in an inner peripheral side of the outer ring member, and configured to extend in an axial direction of the shaft section, wherein each outer-ring-side engaging groove is configured to restrict relative rotation between a corresponding one of the balls and the outer ring member about the axial direction of the shaft section by engagement with the corresponding ball; inner-ring-side engaging grooves formed in an outer peripheral side of the inner ring member, and configured to extend in the axial direction of the shaft section, wherein each inner-ring-side engaging groove is configured to restrict relative rotation between a corresponding one of the balls and the inner ring member about the axial direction of the shaft section by engagement with the corresponding ball; a female spline part formed in an inner peripheral side of one of the outer ring member and the inner ring member as a second ring member other than the first ring member, and configured to engage with a male spline part formed in an outer peripheral side of one of the first shaft and the second shaft as a first shaft member; a female-spline-side annular groove formed and extending circumferentially in the inner peripheral side of the second ring member, wherein the female-spline-side annular groove is defined by a first side wall, a second side wall, and a bottom wall between the first side wall and the second side wall, wherein the first side wall and the second side wall face each other in the axial direction of the shaft section, wherein the second side wall is closer to the shaft section than the first side wall, wherein the female-spline-side annular groove is configured to receive a circlip, wherein the circlip is disposed in a male-spline-side annular groove formed and extending circumferentially in the outer peripheral side of the first shaft member, and is configured to expand into the female-spline-side annular groove, to restrict movement of the first shaft member in the axial direction of the shaft section with respect to the second ring member; and a circlip-restricting part formed in the first side wall of the female-spline-side annular groove, wherein the circlip-restricting part includes: a first inclined portion having a first angle with respect to the axial direction of the shaft section, wherein the first angle is an acute angle; and a second inclined portion closer to a rotational axis of the shaft section than the first inclined portion, and having a second angle with respect to the axial direction of the shaft section, wherein the second angle is smaller than the first angle.

DETAILED DESCRIPTION OF THE INVENTION

First Embodiment

Figure 1:
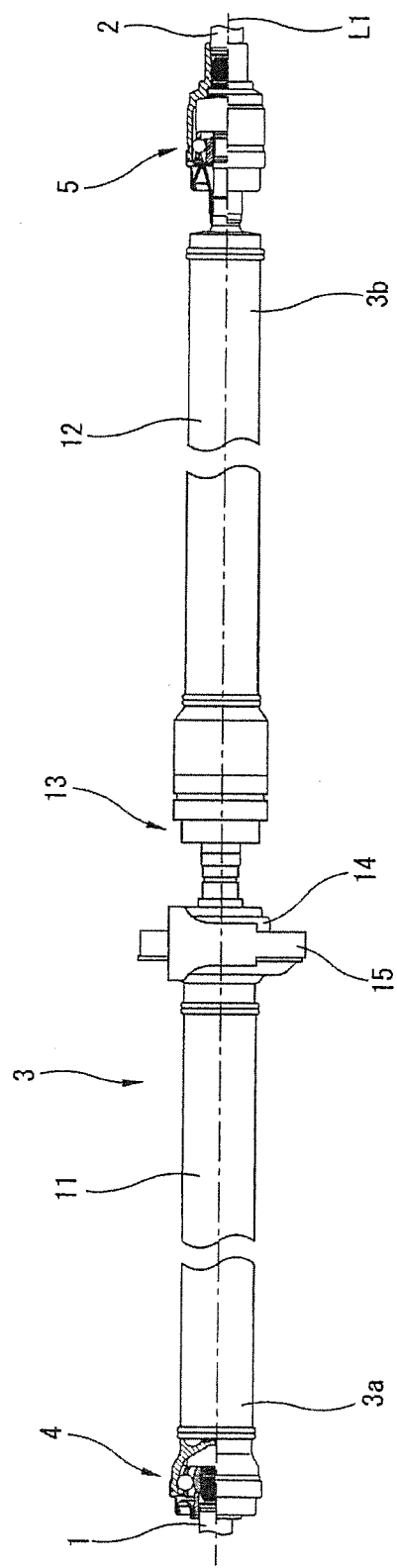
FIG. 1 is a partially-cutaway side view of a propeller shaft according to a first embodiment of the present invention.

FIG. 1 shows a partially-cutaway side view of a propeller shaft according to a first embodiment of the present invention. The propeller shaft is connected between an engine not shown as a drive source of an automotive vehicle and a set of driving wheels not shown, and configured as a power transmission line to transmit a torque from the engine to the driving wheels.

As shown in FIG. 1, the propeller shaft includes a shaft section 3, a first constant velocity joint 4, and a second constant velocity joint 5. Shaft section 3 is configured to be connected between an input shaft 1 as a first shaft and an output shaft 2 as a second shaft. Input shaft 1 is connected to the drive source via a transmission not shown. Output shaft 2 is connected to the driving wheels via a differential gear not shown. First constant velocity joint 4 is attached to a first longitudinal end portion 3a of shaft section 3 closer to the drive source side, and is configured to allow the input shaft 1 and shaft section 3 to rotate together. Second constant velocity joint 5 is attached to a second longitudinal end portion 3b of shaft section 3 closer to the driving wheel side, and is configured to allow the shaft section 3 and output shaft 2 to rotate together. Shaft section 3 is provided with a center bearing 14 at its central portion. Center bearing 14 is fixed to an underside of a floor panel of a vehicle body not shown via a bracket 15 radially outside of center bearing 14.

The following describes specific configuration of longitudinal end portions of input shaft 1 and output shaft 2 closer to shaft section 3, in advance to description about specific configuration of components of the propeller shaft. The following description is focused on input shaft 1, wherein configuration of the longitudinal end portion of output shaft 2 is substantially identical to that of input shaft 1.

Figure 2:
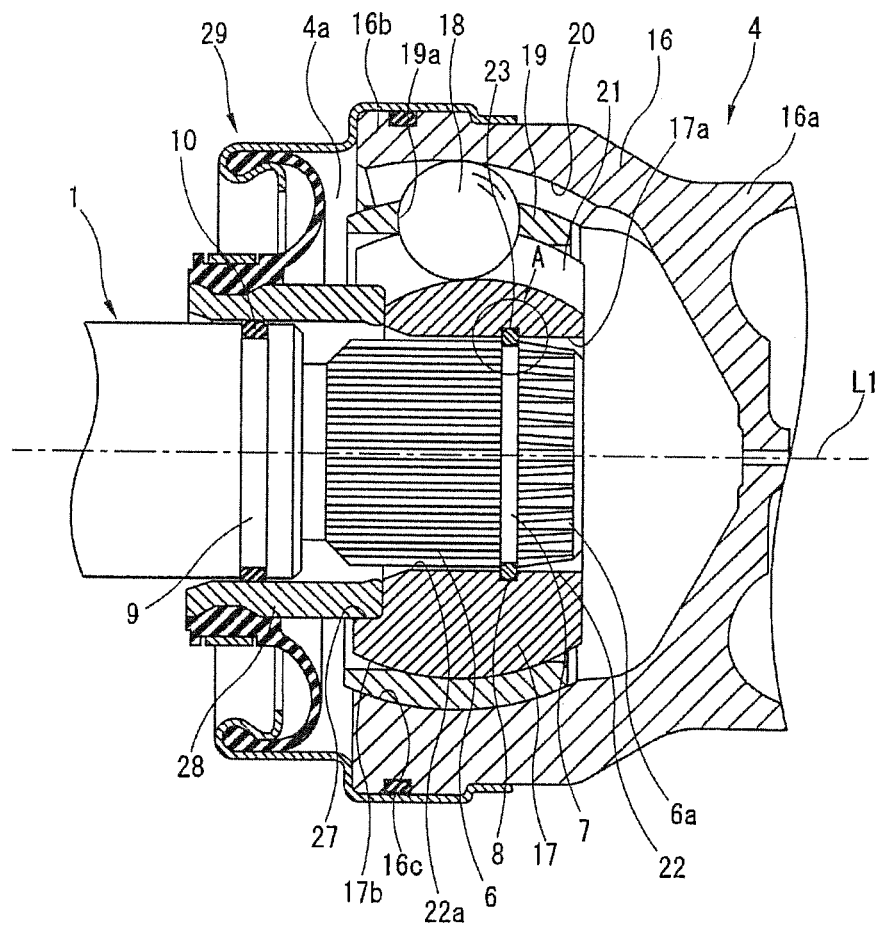
FIG. 2 is a longitudinal sectional view of a first constant velocity joint of the propeller shaft of FIG. 1 when the first constant velocity joint is connected to an input shaft.

As shown in FIG. 2, input shaft 1 is made of an iron-based metal material, and includes a male spline part 6 in an outer peripheral surface of its distal end portion. The male spline part 6 of input shaft 1 includes a male-spline-side annular groove 7 in an outer peripheral surface of its distal end portion 6a, wherein male-spline-side annular groove 7 has a substantially rectangular shape in cross section, and extends circumferentially in the outer peripheral surface. Male-spline-side annular groove 7 is configured to receive a circlip 8. Circlip 8 has a substantially circular shape in cross section, and is configured to be fitted in male-spline-side annular groove 7.

Input shaft 1 is formed with a seal groove 9 at an outer peripheral surface of its larger diameter portion on a distal end side of its smaller diameter portion including the distal end portion 6a, wherein seal groove 9 extends circumferentially in the outer peripheral surface. A seal ring 10 is fitted in seal groove 9, wherein seal ring 10 is an annular seal member made of synthetic rubber.

Shaft section 3 has a two-part structure, namely, includes a drive shaft 11 and a driven shaft 12, as shown in FIG. 1. Drive shaft 11 is made of an iron-based alloy, and connected to input shaft 1 via the first constant velocity joint 4. Driven shaft 12 is also made of an iron-based alloy, and connected to output shaft 2 via the second constant velocity joint 5. The longitudinal end of drive shaft 11 and the longitudinal end of driven shaft 12 facing each other are connected by a third constant velocity joint 13.

As shown in FIG. 2, first constant velocity joint 4 is of an inner ring fixing type in which input shaft 1 is connected and fixed to an inner ring member 17. First constant velocity joint 4 includes an outer ring part 16, inner ring member 17, balls 18, and a cage 19. Outer ring part 16 is formed integrally with a longitudinal end of drive shaft 11 opposite to another longitudinal end facing the driven shaft 12 (in other words, first longitudinal end portion 3a of shaft section 3). Inner ring member 17 is disposed radially inside of outer ring part 16, and configured to receive a torque from input shaft 1. Balls 18 are disposed between outer ring part 16 and inner ring member 17, and configured to roll therebetween and transmit the torque from inner ring member 17 to outer ring part 16. Cage 19 has a cylindrical tubular shape, and is configured to accommodate and retain the balls 18 in corresponding windows 19a, wherein each window 19a is formed to extend through in radial directions of shaft section 3.

Outer ring part 16 has a cylindrical tubular shape or cup-shape whose diameter gradually increases toward a distal end portion 16b closer to input shaft 1 from a proximal end portion 16a closer to shaft section 3. An inner peripheral surface 16c of outer ring part 16 closer to distal end portion 16b is in the form of an arc in longitudinal section, and formed with a plurality of outer-ring-side engaging grooves 20.

The number of outer-ring-side engaging grooves 20 is equal to that of balls 18. Outer-ring-side engaging grooves 20 are arranged at even intervals in the circumferential direction in inner peripheral surface 16c of outer ring part 16. Each outer-ring-side engaging groove 20 extends in the axial direction of shaft section 3, and has a semi-circular shape in cross section, and is configured to engage with a part of a corresponding one of balls 18, to restrict relative rotation between the corresponding ball 18 and outer ring part 16 in the circumferential direction of shaft section 3 about the rotational axis of shaft section 3.

Inner ring member 17 is made of iron-based metal, and has a cylindrical tubular shape having a through hole 17a extending through in the axial direction. Inner ring member 17 includes an outer peripheral surface 17b having a spherical surface (in the form of an arc in longitudinal sectional view), wherein outer peripheral surface 17b is formed with a plurality of inner-ring-side engaging grooves 21.

The number of inner-ring-side engaging grooves 21 is equal to that of balls 18, and therefore equal to that of outer-ring-side engaging grooves 20. Inner-ring-side engaging grooves 21 are arranged at even intervals in the circumferential direction in outer peripheral surface 17b of inner ring member 17. Each inner-ring-side engaging groove 21 extends in the axial direction, facing a corresponding one of outer-ring-side engaging grooves 20. Each inner-ring-side engaging groove 21 has a semi-circular shape in cross section, and is configured to engage with a corresponding one of balls 18, to restrict relative rotation between the corresponding ball 18 and inner ring member 17 in the circumferential direction of shaft section 3 about the rotational axis of shaft section 3.

The region of the inner peripheral surface of through hole 17a closer to shaft section 3 is formed with a female spline part 22 into which male spline part 6 of input shaft 1 is inserted and fitted in the axial direction. The region of female spline part 22 closer to shaft section 3 than its center in the axial direction is formed with a female-spline-side annular groove 23 which extends circumferentially and is configured to engage with circlip 8 of input shaft 1.

Figure 3:
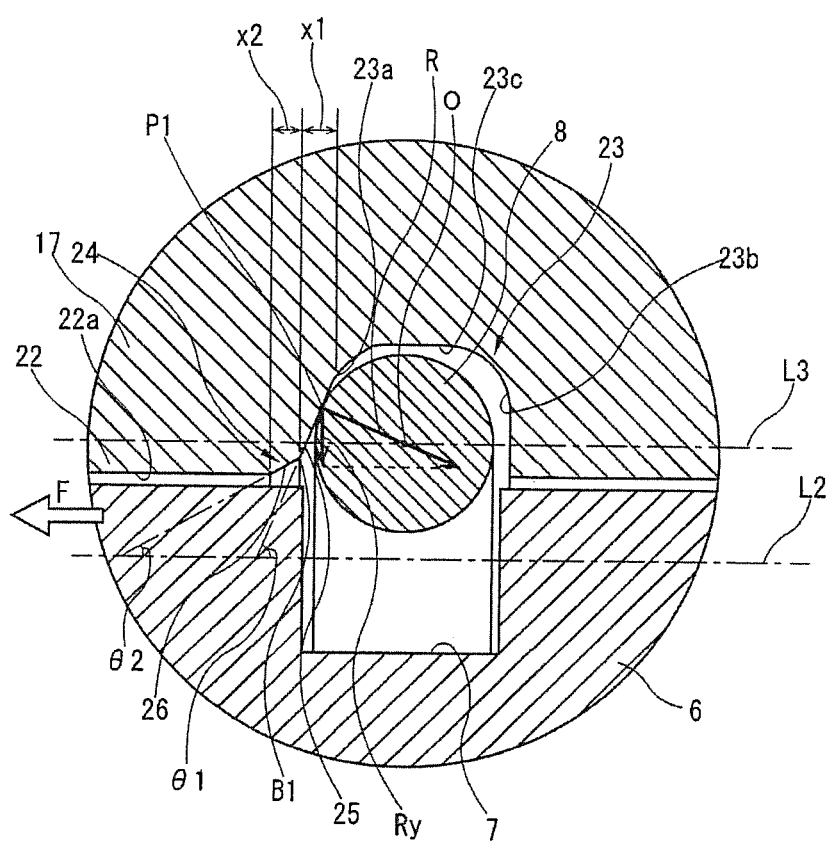
FIG. 3 is an enlarged view of a part of the first constant velocity joint indicated by "A" in FIG. 2.

As shown in FIG. 3, female-spline-side annular groove 23 is defined by a first side wall 23a, a second side wall 23b, and a bottom wall 23c in cross section. The first side wall 23a and second side wall 23b define both ends of female-spline-side annular groove 23 in the axial direction of shaft section 3, and face each other in the direction of shaft section 3. Bottom wall 23c is connected between first side wall 23a and second side wall 23b. When input shaft 1 is inserted into through hole 17a of inner ring member 17 for assembling, the circlip 8 is compressed with decreasing diameter by end surface 22a of female spline part 22 in the radial direction of shaft section 3. When male-spline-side annular groove 7 reaches the female-spline-side annular groove 23, the circlip 8 is released from the compressed state, and expands outwardly in the radial direction by its elastic restoring force, and enters the female-spline-side annular groove 23. The circlip 8 thereby serves to restrict movement of input shaft 1 with respect to inner ring member 17 in the axial direction of shaft section 3.

Of the first side wall 23a and the second side wall 23b of female-spline-side annular groove 23, the first side wall 23a farther from shaft section 3 in the axial direction is formed with a circlip-restricting surface 24 serving to prevent unintentional detachment of input shaft 1 when the propeller shaft is in normal use, while reducing a pulling-out load applied to input shaft 1 when input shaft 1 is pulled out of inner ring member 17.

Circlip-restricting surface 24 includes a first inclined surface 25 and a second inclined surface 26. First inclined surface 25 has a first angle θ1 with respect to the axial direction of shaft section 3, i.e. with respect to rotational axis L1 of shaft section 3, wherein first angle θ1 is an acute angle larger than 45 degrees. It is to be noted that the first angle θ1 is on the open side of circlip-restricting surface 24 facing a cross-section center O of circlip 8. Second inclined surface 26 is located closer to rotational axis L1 of shaft section 3 than first inclined surface 25, and is continuous with first inclined surface 25, and has a second angle θ2 with respect to the rotational axis L1 of shaft section 3, wherein second angle θ2 is an acute angle smaller than 45 degrees. It is to be noted that the second angle θ2 is on the open side of circlip-restricting surface 24 facing the cross-section center O of circlip 8. For illustration, FIG. 3 shows an imaginary line L2 parallel to the rotational axis L1 of shaft section 3, wherein the first angle θ1 and second angle θ2 are shown with respect to imaginary line L2.

First inclined surface 25 has a substantially straight shape in the longitudinal section shown in FIG. 3 taken along a plane passing through the rotational axis L1 of shaft section 3. Namely, first inclined surface 25 is a circular conical surface around the rotational axis L1. Similarly, second inclined surface 26 has a substantially straight shape in the longitudinal section shown in FIG. 3 taken along a plane passing the rotational axis L1 of shaft section 3. Namely, second inclined surface 26 is a circular conical surface. In the axial direction of shaft section 3, the first inclined surface 25 has a dimension x1, and second inclined surface 26 has a dimension x2, wherein the dimension x2 is smaller than the dimension x1.

As shown in FIG. 3, a boundary portion B1 of circlip-restricting surface 24 between first inclined surface 25 and second inclined surface 26 is located closer to the rotational axis L1 of shaft section 3 in the radial direction of shaft section 3 than a contact portion P1 of circlip-restricting surface 24 in contact with circlip 8 when circlip 8 is in free state in female-spline-side annular groove 23. In other words, circlip 8 is configured to be maintained in a state allowed to contact the first inclined surface 25 when circlip 8 is in free state in female-spline-side annular groove 23 under no pulling-out load.

Furthermore, the boundary portion B1 of circlip-restricting surface 24 between first inclined surface 25 and second inclined surface 26 is located closer to the rotational axis L1 of shaft section 3 in the radial direction of shaft section 3 than the cross-section center O of circlip 8 (or than an imaginary line L3 parallel to the rotational axis L1 and passing through the cross-section center O) when circlip 8 is in free state in female-spline-side annular groove 23.

The positional relationship between circlip 8 and circlip-restricting surface 24 described above holds constantly, not only when the central axis of circlip 8 (in the axial direction of shaft section 3) is identical to that of the shaft section 3 or input shaft 1, but also when the central axis of circlip 8 is eccentric with respect to the shaft section 3 or input shaft 1 in the radial direction.

Figure 4:
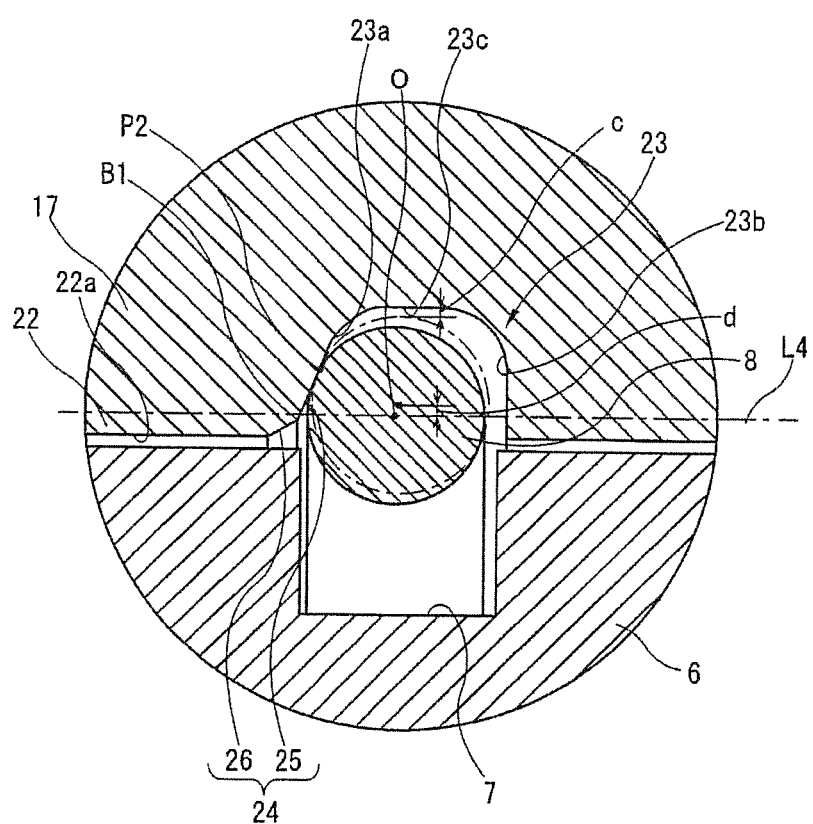
FIG. 4 is an enlarged view of the part of the first constant velocity joint indicated by "A" in FIG. 2 when eccentricity of a circlip with respect to the input shaft is maximized.

As shown in FIG. 4, where a radial clearance "c" is defined as a clearance between bottom wall 23c of female-spline-side annular groove 23 and circlip 8 when the circlip 8 and input shaft 1 are coaxially arranged as indicated by an imaginary line, the circlip 8 is assumed to be maximally displaced by a displacement "d" that is substantially equal to radial clearance c. Even under this condition of maximum displacement, the boundary portion B1 of circlip-restricting surface 24 between first inclined surface 25 and second inclined surface 26 is maintained closer to the rotational axis L1 of shaft section 3 in the radial direction of shaft section 3 than a contact portion P2 of circlip-restricting surface 24 to contact the circlip 8 under this condition, and also than the cross-section center O of circlip 8 (or than an imaginary line L4 parallel to the rotational axis L1 and passing through the cross-section center O).

During a process of forming the inner ring member 17, the female-spline-side annular groove 23 including the first inclined surface 25 and second inclined surface 26 of circlip-restricting surface 24 is simultaneously formed by a single processing tool, i.e. a single cutting tool.

As shown in FIG. 2, the open end of through hole 17a farther from shaft section 3 is formed with a sleeve-inserted portion 27 having a larger diameter than the portion including the female spline part 22. A sleeve 28 constituting the first constant velocity joint 4 is pressed in and fixed to the sleeve-inserted portion 27 of inner ring member 17.

Sleeve 28 is made of an iron-based metal material, and has a cylindrical tubular shape, and is configured to allow insertion of input shaft 1 therein when input shaft 1 is connected to first constant velocity joint 4. The inner peripheral surface of sleeve 28 is in contact with seal ring 10 of input shaft 1, sealing liquid-tightly the internal space of first constant velocity joint 4.

A boot 29 is provided to extend between the outer peripheral surface of sleeve 28 and the outer peripheral surface of outer ring part 16, covering the open front end 4a of first constant velocity joint 4. Boot 29 is made of synthetic rubber.

The configuration that the separate sleeve 28 is pressed into inner ring member 17 may be modified such that inner ring member 17 is formed integrally with a sleeve part serving similarly as the sleeve 28.

Figure 5:
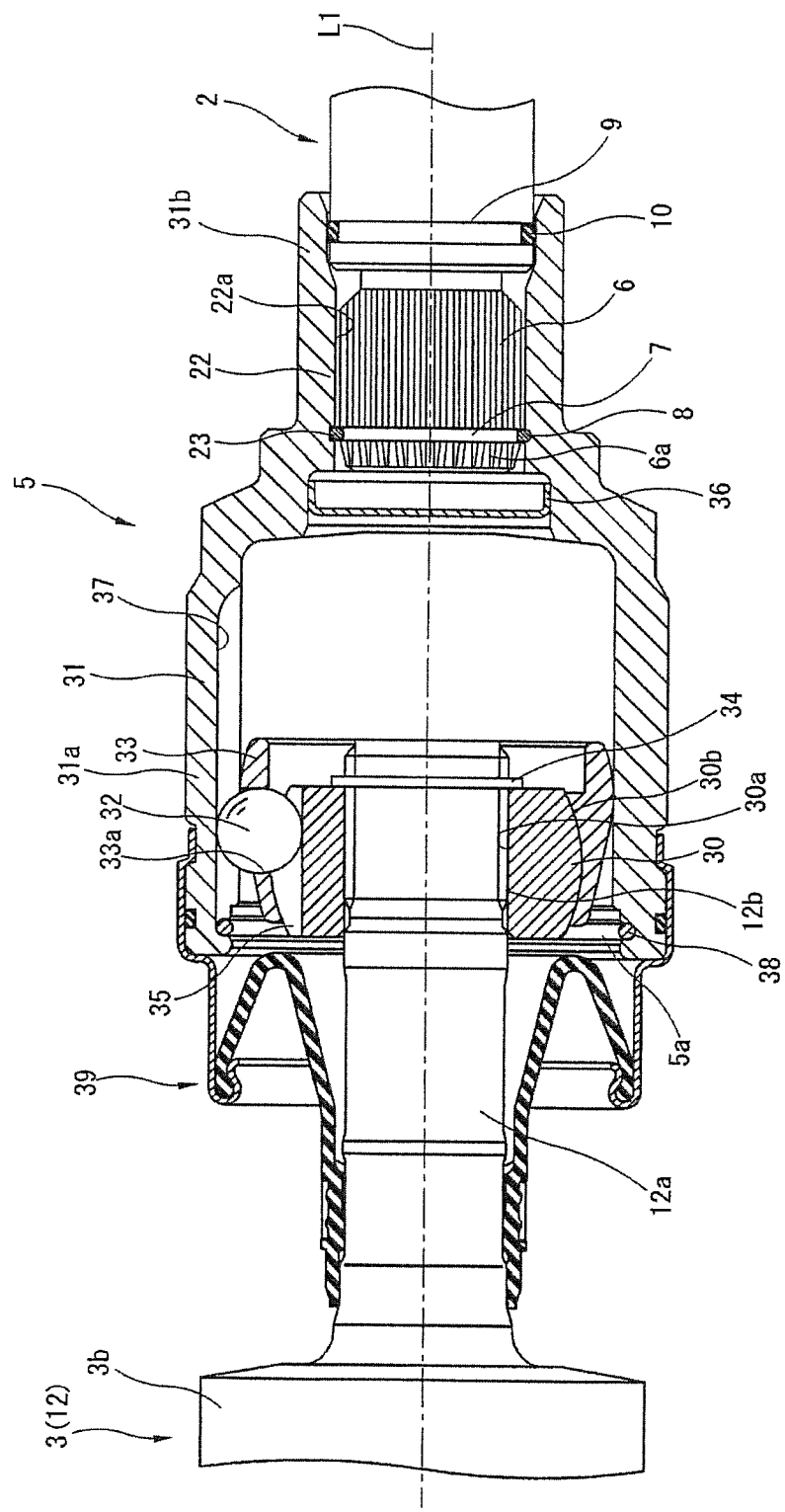
FIG. 5 is a longitudinal sectional view of a second constant velocity joint of the propeller shaft of FIG. 1 when the second constant velocity joint is connected to an output shaft.

FIG. 5 shows a longitudinal sectional view of second constant velocity joint 5. Second constant velocity joint 5 is of an outer-ring-fixing type in which outer ring member 31 is connected and fixed to output shaft 2, while first constant velocity joint 4 is of the inner ring fixing type. Second constant velocity joint 5 includes an inner ring member 30, an outer ring member 31, balls 32, and a cage 33. Inner ring member 30 is connected to a stub shaft 12a of driven shaft 12 opposite to its longitudinal end facing the drive shaft 11 (in other words, connected to a second longitudinal end portion 3b of shaft section 3), and configured to receive a torque from shaft section 3. Outer ring member 31 is disposed radially outside of inner ring member 30. Balls 32 are disposed between inner ring member 30 and outer ring member 31, and configured to roll therebetween and transmit the torque from inner ring member 30 to outer ring part 31. Cage 33 has a cylindrical tubular shape, and is configured to accommodate and retain the balls 32 in corresponding windows 33a, wherein each window 33a is formed to extend through in the radial direction of shaft section 3.

Inner ring member 30 is made of iron-based metal, and has a cylindrical tubular shape, and includes a female spline part 30a in its inner peripheral surface, wherein female spline part 30a extends in the axial direction. Engagement between female spline part 30a and a male spline part 12b formed in a distal end portion of stub shaft 12a allows the inner ring member 30 to rotate along with the driven shaft 12. A retaining ring 34 is provided to prevent movement of inner ring member 30 with respect to stub shaft 12a in the direction of detachment.

Inner ring member 30 has an outer peripheral surface 30b having a spherical shape (arc shape in longitudinal sectional view), and including a plurality of inner-ring-side engaging grooves 35 serving similarly as inner-ring-side engaging grooves 21 in first constant velocity joint 4.

Outer ring member 31 has a cylindrical tubular shape having a step, including a larger-diameter tubular part 31a closer to shaft section 3, and a smaller-diameter tubular part 31b closer to output shaft 2, wherein the larger-diameter tubular part 31a is larger in diameter than the smaller-diameter tubular part 31b. A seal cap 36 is provided between larger-diameter tubular part 31a and smaller-diameter tubular part 31b in outer ring member 31, to separate the internal space of outer ring member 31 into the internal space of larger-diameter tubular part 31a and the internal space of smaller-diameter tubular part 31b from each other.

The larger-diameter tubular part 31a of outer ring member 31 is configured to have a specific inside diameter to accommodate the inner ring member 30 inside thereof. The inner peripheral surface of larger-diameter tubular part 31a is formed with a plurality of outer-ring-side engaging grooves 37.

Basic configuration of each outer-ring-side engaging groove 37 is similar to that of outer-ring-side engaging groove 20 in first constant velocity joint 4, but different from outer-ring-side engaging groove 20 in that outer-ring-side engaging groove 37 has a larger size in the axial direction of shaft section 3. Each outer-ring-side engaging groove 37 is configured to allow the corresponding ball 32 to roll in the axial direction of shaft section 3, and thereby allow relative movement between shaft section 3 and outer ring member 31.

The end portion of the inner peripheral surface of larger-diameter tubular part 31a closer to shaft section 3 is provided with a ring 38 for preventing the balls 32 from dropping from outer-ring-side engaging grooves 37, wherein balls 32 are allowed to roll in the axial direction of shaft section 3.

A boot 39 is provided to extend between the outer peripheral surface of larger-diameter tubular part 31a of outer ring member 31 and the outer peripheral surface of stub shaft 12a, covering the open front end 5a of second constant velocity joint 5 closer to shaft section 3. Boot 39 is made of synthetic rubber.

The smaller-diameter tubular part 31b of outer ring member 31 is formed with female spline part 22 at part of its inner peripheral surface closer to shaft section 3, wherein female spline part 22 is configured to engage with male spline part 6 of output shaft 2 by relative movement in the axial direction of shaft section 3. The portion of the inner peripheral surface of smaller-diameter tubular part 31b closer to shaft section 3 than the central portion of female spline part 22 is formed with female-spline-side annular groove 23, wherein female-spline-side annular groove 23 extends circumferentially in the inner peripheral surface. One side wall of female-spline-side annular groove 23 farther from shaft section 3 is formed with circlip-restricting surface 24. This configuration is the same as first constant velocity joint 4, wherein the common reference numerals are used.

The part of the inner peripheral surface of the smaller-diameter tubular part 31b of outer ring member 31 closer to output shaft 2 than female spline part 22 is configured to be in press contact with seal ring 10 of output shaft 2 when output shaft 2 is connected to second constant velocity joint 5, thereby sealing liquid-tightly the internal space of second constant velocity joint 5.

Advantageous Effects

In general, in the propeller shaft provided with circlip 8 that restricts movement of input shaft 1 relative to inner ring member 17 in the axial direction of shaft section 3, application of a large pulling-out load F to input shaft 1 in the direction of detachment causes the circlip 8 to be compressed with decreasing diameter against elastic restoring force in sliding contact with the inclined circlip-restricting surface 24, and pass through the circlip-restricting surface 24, thereby releasing the connection between input shaft 1 and inner ring member 17.

In the situation described above, the circlip 8 is applied with a reaction force R perpendicular to circlip-restricting surface 24 and based on pulling-out load F, and is compressed with decreasing diameter by a component of reaction force R in the radial direction toward rotational axis L1, i.e. a compressing-direction component Ry.

Figure 6:
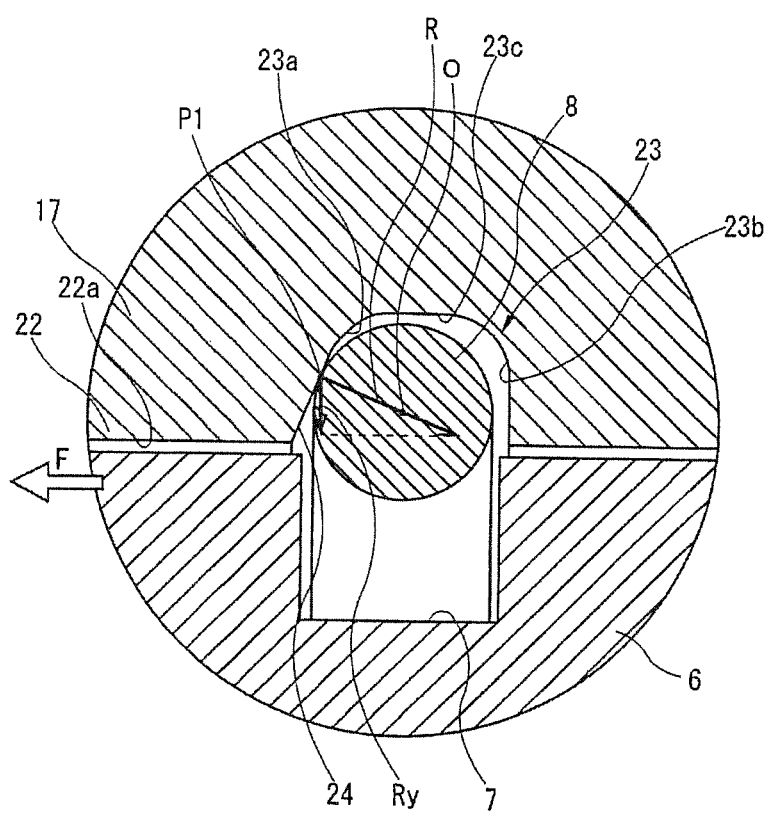
FIG. 6 is an enlarged view of a part of a first constant velocity joint according to a reference example in which a circlip-restricting surface is monotonous, the part corresponding to the part "A" in FIG. 2.

FIG. 6 shows a reference example in which circlip-restricting surface 24 is formed monotonous to have a relatively large angle with respect to the axial direction of shaft section 3 for ensuring to restrict axial movement of circlip 8. With this configuration, the pulling-out load F required to allow complete detachment of input shaft 1 from inner ring member 17 rises in a quadratic manner as indicated by a narrow line in FIG. 8. This adversely affects efficiency of operation of detachment. This disadvantage may be raised by an error in dimension of circlip-restricting surface 24, and a burr occurring at a boundary between circlip-restricting surface 24 and end surface 22a of female spline part 22 during cutting operation for circlip-restricting surface 24.

Figure 7:
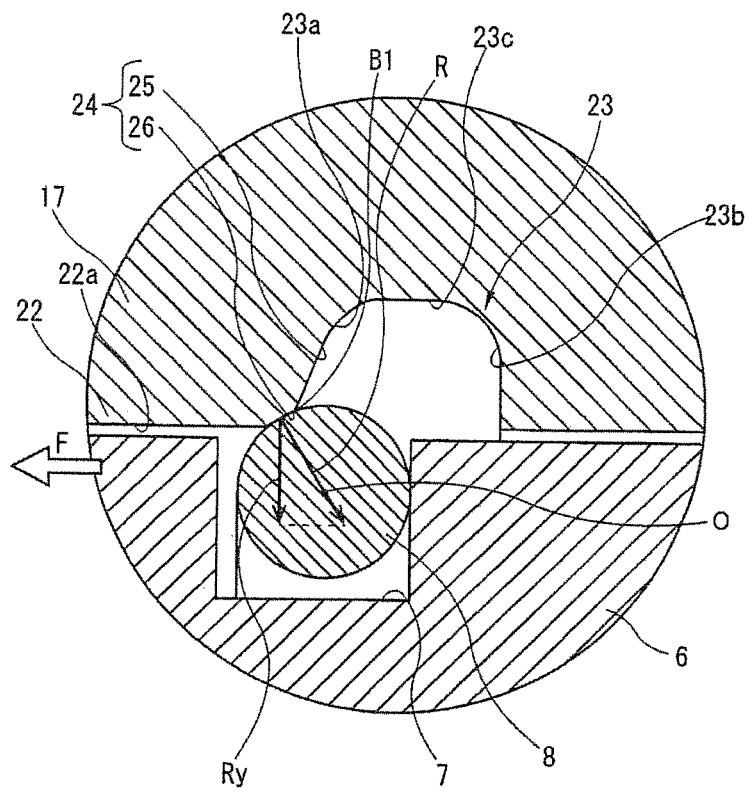
FIG. 7 is an enlarged view of the part of the first constant velocity joint indicated by "A" in FIG. 2 when the circlip passes through a second inclined portion of a circlip-restricting surface.

In contrast, in the present embodiment, the configuration that circlip-restricting surface 24 is implemented by first inclined surface 25 and second inclined surface 26 having different angles, allows smooth detachment of input shaft 1 from inner ring member 17 as follows. When circlip 8 is in contact with first inclined surface 25 at start of pulling-out operation of input shaft 1, the compressing-direction component Ry acting on circlip 8 is remains small as shown in FIG. 3. When pulling-out load F exceeds a specific threshold value so that the contact portion of circlip 8 reaches the second inclined surface 26, the compressing-direction component Ry acting on circlip 8 increases with change in the inclination of the contact point between circlip 8 and circlip-restricting surface 24, as shown in FIG. 7.

Figure 8:
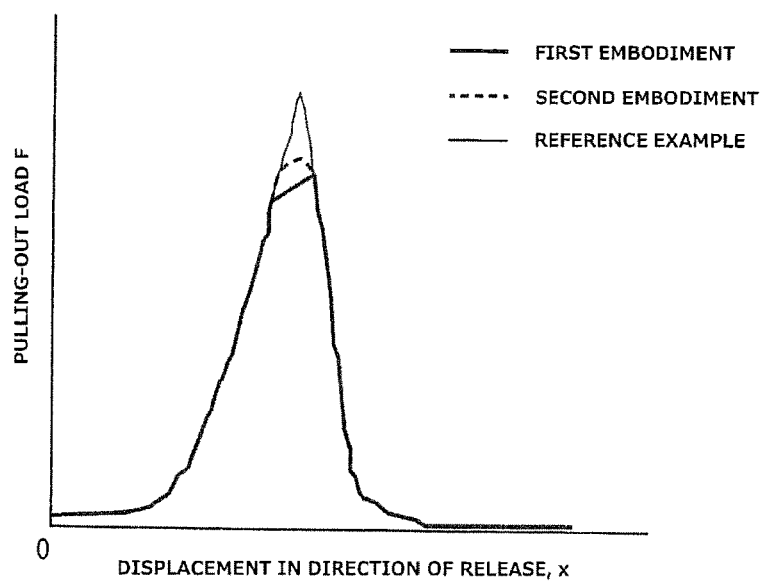
FIG. 8 is a graph showing changes of a pulling-out load applied to the input shaft in the first embodiment, a second embodiment, and the reference example.
Figure 9:
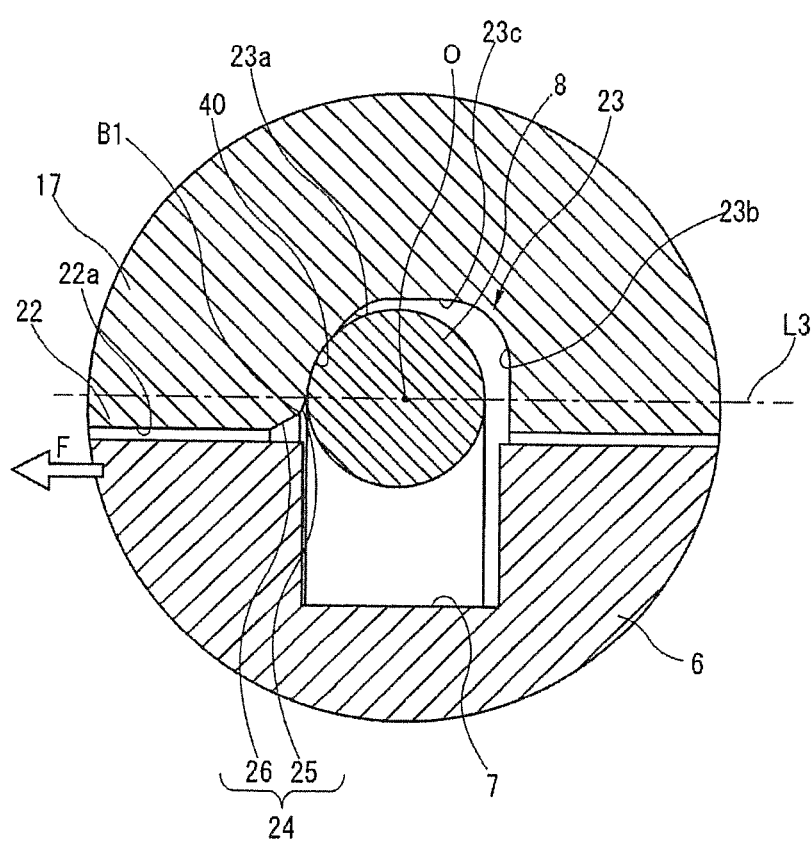
FIG. 9 is an enlarged view of the part of the first constant velocity joint indicated by "A" in FIG. 2 when the circlip-restricting surface is pressed and deformed by the circlip.

Namely, the transition of the contact point of circlip 8 from first inclined surface 25 to second inclined surface 26 ensures the sufficient compressing-direction component Ry, and eliminates the necessity of excessive pulling-out load F applied to input shaft 1 as indicated by a bold solid line in FIG. 8, and thereby allows the input shaft 1 to be pulled out from inner ring member 17 by stable pulling-out load F. This enhances the efficiency of pulling-out operation.

The configuration that the first angle $\theta 1$ of first inclined surface 25 is larger than 45 degrees results in that the compressing-direction component Ry of reaction force R is relatively small with respect to pulling-out load F when circlip 8 is in contact with first inclined surface 25. This serves to prevent the input shaft 1 from being easily pulled out, unless input shaft 1 is applied with large pulling-out load F intentionally. Accordingly, even when input shaft 1 is applied with a force in the direction of detachment due to an external force such as a reaction force from a road surface while the propeller shaft is in use, the input shaft 1 is prevented from dropping unintentionally.

The configuration that the second angle $\theta 2$ is smaller than 45 degrees results in that after the contact point of circlip 8 reaches second inclined surface 26, the compressing-direction component Ry of reaction force R is relatively large with respect to pulling-out load F, so that circlip 8 is easily compressed with decreasing diameter by this compressing-direction component Ry. This further enhances the efficiency of pulling-out operation.

The configuration that the boundary portion B1 of the circlip-restricting surface 24 between first inclined surface 25 and second inclined surface 26 is set closer to the rotational axis L1 than the contact portion P1 between circlip 8 and circlip-restricting surface 24 when circlip 8 is in free state in female-spline-side annular groove 23, serves to force the circlip 8 to be put into contact with first inclined surface 25 before contact between circlip 8 and second inclined surface 26. This prevents unintentional compression of circlip 8, and thereby prevents unintentional detachment of input shaft 1 from inner ring member 17.

The configuration that the boundary portion B1 of circlip-restricting surface 24 between first inclined surface 25 and second inclined surface 26 is located closer to the rotational axis L1 than the cross-section center O of circlip 8 when circlip 8 is in free state in female-spline-side annular groove 23, serves to maintain the condition that at least part of first inclined surface 25 is closer to the rotational axis L1 in the radial direction than a deformed portion 40 of circlip-restricting surface 24 even when circlip-restricting surface 24 is deformed by pressure from circlip 8 under a very large pulling-out load F applied to input shaft 1. This serves to force the circlip 8 to be put into contact with first inclined surface 25 before contact between circlip 8 and second inclined surface 26, even when circlip-restricting surface 24 is deformed by pressure from circlip 8. This prevents unintentional compression of circlip 8, and thereby prevents unintentional detachment of input shaft 1 from inner ring member 17.

The further configuration that the positional relationship between circlip 8 and circlip-restricting surface 24 described above holds constantly, not only when the central axis of circlip 8 is identical to that of the shaft section 3, but also when the central axis of circlip 8 is eccentric maximally with respect to the shaft section 3 in the radial direction, serves to prevent the circlip 8 from being put into contact with second inclined surface 26 due to eccentric position of circlip 8 without prior contact with first inclined surface 25, and thereby prevent circlip 8 from escaping from female-spline-side annular groove 23, and thereby prevent input shaft 1 from being unintentionally released from inner ring member 17.

The configuration that the dimension x1 of first inclined surface 25 in the axial direction of shaft section 3 is relatively large, serves to prevent the circlip 8 from being put into contact with second inclined surface 26 due to eccentric position of circlip 8 without prior contact with first inclined surface 25, and thereby prevent circlip 8 from escaping from female-spline-side annular groove 23, and thereby prevent input shaft 1 from being unintentionally released from inner ring member 17.

The configuration that the dimension x2 of second inclined surface 26 in the axial direction of shaft section 3 is relatively small, serves to allow the size of first constant velocity joint 4 in the axial direction of shaft section 3 to be made compact, and thereby enhance the mountability of the propeller shaft to the vehicle.

The configuration that the female-spline-side annular groove 23 including the first inclined surface 25 and second inclined surface 26 of circlip-restricting surface 24 is simultaneously formed by a single cutting tool, serves to reduce the number of operations, and also prevent the occurrence of a burr in the boundary portion B1 of circlip-restricting surface 24 between first inclined surface 25 and second inclined surface 26, and thereby suppress the pulling-out load F from being unintentionally raised by resistance by the burr.

The advantageous effects described above, which are about the connection between input shaft 1 and first constant velocity joint 4 (inner ring member 17), are also true for the connection between output shaft 2 and second constant velocity joint 5 (outer ring member 31).

Second Embodiment

Figure 10:
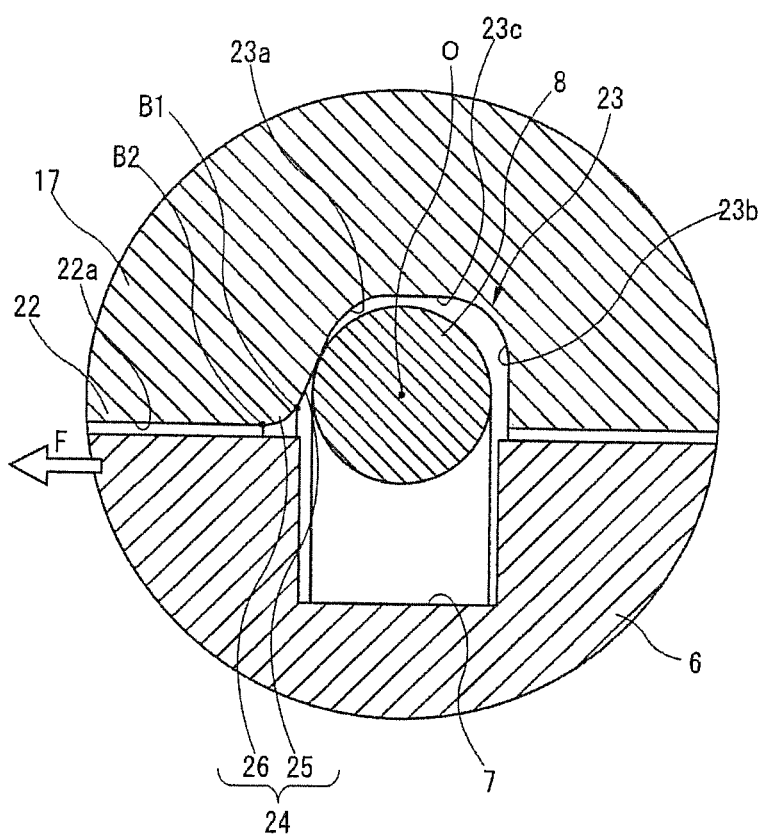
FIG. 10 is an enlarged view of a part of a first constant velocity joint according to a second embodiment of the present invention, the part corresponding to the part "A" in FIG. 2.

FIG. 10 shows a second embodiment of the present invention in which the longitudinal section of second inclined surface 26 taken along the plane containing the rotational axis L1 of shaft section 3 is formed to have a rounded shape projecting toward the male-spline-side annular groove 7.

According to this configuration, second inclined surface 26 projects toward male-spline-side annular groove 7 as compared to the first embodiment, so that the pulling-out load F required for circlip 8 to pass through the second inclined surface 26 is slightly larger than in the first embodiment, as indicated by a broken line in FIG. 8. However, the boundary portion B1 between first inclined surface 25 and second inclined surface 26, and the boundary portion B2 between second inclined surface 26 and end surface 22a of female spline part 22 are rounded, so that the boundary portion B1 and boundary portion B2 are connected by a smooth continuous curved surface. This serves to allow the circlip 8 to smoothly slide on the circlip-restricting surface 24, and thereby allow smooth pulling-out operation for input shaft 1.

In summary, the propeller shaft according to the present embodiments is characterized by the following features.

A propeller shaft for transmitting rotation between a drive source of a vehicle and a driving wheel of the vehicle, includes: a shaft section (3) configured to be connected between a first shaft (1) and a second shaft (2), wherein the first shaft (1) is configured to be connected to the drive source, and wherein the second shaft (2) is configured to be connected to the driving wheel; an outer ring member (16; 31) and an inner ring member (17; 30), wherein the shaft section (3) is provided with one of the outer ring member (16; 31) and the inner ring member (17; 30) as a first ring member (16; 30), wherein the outer ring member (16; 31) has a tubular shape, wherein the inner ring member (17; 30) has a tubular shape, and wherein the inner ring member (17; 30) is disposed radially inside the outer ring member (16; 31); a plurality of balls (18; 32) disposed between the outer ring member (16; 31) and the inner ring member (17; 30); outer-ring-side engaging grooves (20; 37) formed in an inner peripheral side (16c; 31a) of the outer ring member (16; 31), and configured to extend in an axial direction of the shaft section (3), wherein each outer-ring-side engaging groove (20; 37) is configured to restrict relative rotation between a corresponding one of the balls (18; 32) and the outer ring member (16) about the axial direction of the shaft section (3) by engagement with the corresponding ball (18; 32); inner-ring-side engaging grooves (21; 35) formed in an outer peripheral side (17b; 30b) of the inner ring member (17; 30), and configured to extend in the axial direction of the shaft section (3), wherein each inner-ring-side engaging groove (21; 35) is configured to restrict relative rotation between a corresponding one of the balls (18; 32) and the inner ring member (17; 30) about the axial direction of the shaft section (3) by engagement with the corresponding ball (18); a female spline part (22) formed in an inner peripheral side of one of the outer ring member (16; 31) and the inner ring member (17; 30) as a second ring member (17; 31) other than the first ring member (16; 30), and configured to engage with a male spline part (6) formed in an outer peripheral side of one of the first shaft (1) and the second shaft (2) as a first shaft member (1; 2); a female-spline-side annular groove (23) formed and extending circumferentially in the inner peripheral side of the second ring member (17; 30), wherein the female-spline-side annular groove (23) is defined by a first side wall (23a), a second side wall (23b), and a bottom wall (23c) between the first side wall (23a) and the second side wall (23b), wherein the first side wall (23a) and the second side wall (23b) face each other in the axial direction of the shaft section (3), wherein the second side wall (23b) is closer to the shaft section (3) than the first side wall (23a), wherein the female-spline-side annular groove (23) is configured to receive a circlip (8), wherein the circlip (8) is disposed in a male-spline-side annular groove (7) formed and extending circumferentially in the outer peripheral side of the first shaft member (1; 2), and is configured to expand into the female-spline-side annular groove (23), to restrict movement of the first shaft member (1; 2) in the axial direction of the shaft section (3) with respect to the second ring member (17; 30); and a circlip-restricting part (24) formed in the first side wall (23a) of the female-spline-side annular groove (23), wherein the circlip-restricting part (24) includes: a first inclined portion (25) having a first angle (θ1) with respect to the axial direction of the shaft section (3), wherein the first angle (θ1) is an acute angle; and a second inclined portion (26) closer to a rotational axis (L1) of the shaft section (3) than the first inclined portion (25), and having a second angle (θ2) with respect to the axial direction of the shaft section (3), wherein the second angle (θ2) is smaller than the first angle (θ1).

The propeller shaft is further configured such that the first angle (θ1) is larger than 45 degrees.

The propeller shaft is further configured such that the second angle (θ2) is smaller than 45 degrees.

The propeller shaft is further configured such that a boundary portion (B1) of the circlip-restricting part (24) between the first inclined portion (25) and the second inclined portion (26) is closer to the rotational axis (L1) of the shaft section (3) than a contact portion (P1) of the circlip-restricting part (24), wherein the circlip (8) is configured to be in contact with the contact portion (P1) when the circlip (8) is in free state in the female-spline-side annular groove (23).

The propeller shaft is further configured such that the boundary portion (B1) of the circlip-restricting part (24) is closer to the rotational axis (L1) of the shaft section (3) than a cross-section center (O) of the circlip (8) when the circlip (8) is in free state.

The propeller shaft is further configured such that the second inclined portion (26) is smaller in dimension in the axial direction of the shaft section (3) than the first inclined portion (25).

The propeller shaft is further configured such that the boundary portion (B1) of the circlip-restricting part (24) is closer to the rotational axis (L1) of the shaft section (3) than the cross-section center (O) of the circlip (8), even when eccentricity of the circlip (8) from the rotational axis (L1) of the shaft section (3) in a radial direction of the shaft section (3) is maximized under condition that the circlip (8) is in the female-spline-side annular groove (23).

The propeller shaft is further configured such that the boundary portion (B1) of the circlip-restricting part (24) is closer to the rotational axis (L1) of the shaft section (3) than the contact portion (P1) of the circlip-restricting part (24), even when eccentricity of the circlip (8) from the rotational axis (L1) of the shaft section (3) in a radial direction of the shaft section (3) is maximized under condition that the circlip (8) is in the female-spline-side annular groove (23).

The propeller shaft is further configured such that the second inclined portion (26) of the circlip-restricting part (24) has a substantially straight shape in longitudinal sectional view along the axial direction of the shaft section (3).

The propeller shaft is further configured such that the second inclined portion (26) of the circlip-restricting part (24) has a rounded shape projecting toward the male-spline-side annular groove (7) in longitudinal sectional view along the axial direction of the shaft section (3).

The propeller shaft is further configured such that the first inclined portion (25) and the second inclined portion (26) of the circlip-restricting part (24) are formed simultaneously by a single processing tool.

The entire contents of Japanese Patent Application 2016-082561 filed Apr. 18, 2016 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A propeller shaft for transmitting rotation between a drive source of a vehicle and a driving wheel of the vehicle, comprising:
   a shaft section configured to be connected between a first shaft and a second shaft, wherein the first shaft is configured to be connected to the drive source, and wherein the second shaft is configured to be connected to the driving wheel;
   an outer ring member and an inner ring member, wherein the shaft section is provided with one of the outer ring member and the inner ring member as a first ring member, wherein the outer ring member has a tubular shape, wherein the inner ring member has a tubular shape, and wherein the inner ring member is disposed radially inside the outer ring member;
   a plurality of balls disposed between the outer ring member and the inner ring member;
   outer-ring-side engaging grooves formed in an inner peripheral side of the outer ring member, and configured to extend in an axial direction of the shaft section, wherein each outer-ring-side engaging groove is configured to restrict relative rotation between a corresponding one of the balls and the outer ring member about the axial direction of the shaft section by engagement with the corresponding ball;
   inner-ring-side engaging grooves formed in an outer peripheral side of the inner ring member, and configured to extend in the axial direction of the shaft section, wherein each inner-ring-side engaging groove is configured to restrict relative rotation between a corresponding one of the balls and the inner ring member about the axial direction of the shaft section by engagement with the corresponding ball;
   a female spline part formed in an inner peripheral side of one of the outer ring member and the inner ring member as a second ring member other than the first ring member, and configured to engage with a male spline part formed in an outer peripheral side of one of the first shaft and the second shaft as a first shaft member;
   a female-spline-side annular groove formed and extending circumferentially in the inner peripheral side of the second ring member, wherein the female-spline-side annular groove is defined by a first side wall, a second side wall, and a bottom wall between the first side wall and the second side wall, wherein the first side wall and the second side wall face each other in the axial direction of the shaft section, wherein the second side wall is closer to the shaft section than the first side wall, wherein the female-spline-side annular groove is configured to receive a circlip, wherein the circlip is disposed in a male-spline-side annular groove formed and extending circumferentially in the outer peripheral side of the first shaft member, and is configured to expand into the female-spline-side annular groove, to restrict movement of the first shaft member in the axial direction of the shaft section with respect to the second ring member; and
   a circlip-restricting part formed in the first side wall of the female-spline-side annular groove, wherein the circlip-restricting part includes:
   a first inclined portion having a first angle with respect to the axial direction of the shaft section, wherein the first angle is an acute angle; and
   a second inclined portion closer to a rotational axis of the shaft section than the first inclined portion, and having a second angle with respect to the axial direction of the shaft section, wherein the second angle is smaller than the first angle;
   wherein a boundary portion of the circlip-restricting part between the first inclined portion and the second inclined portion is closer to the rotational axis of the shaft section than a contact portion of the circlip-restricting part, wherein the circlip is configured to be in contact with the contact portion when the circlip is in a free state in the female-spline-side annular groove.

2. The propeller shaft as claimed in claim 1, wherein the first angle is larger than 45 degrees.

3. The propeller shaft as claimed in claim 2, wherein the second angle is smaller than 45 degrees.

4. The propeller shaft as claimed in claim 1, wherein the boundary portion of the circlip-restricting part is closer to the rotational axis of the shaft section than a cross-section center of the circlip when the circlip is in the free state.

5. The propeller shaft as claimed in claim 4, wherein the second inclined portion is smaller in dimension in the axial direction of the shaft section than the first inclined portion.

6. The propeller shaft as claimed in claim 4, wherein the boundary portion of the circlip-restricting part is closer to the rotational axis of the shaft section than the cross-section center of the circlip, even when eccentricity of the circlip from the rotational axis of the shaft section in a radial direction of the shaft section is maximized under a condition that the circlip is in the female-spline-side annular groove.

7. The propeller shaft as claimed in claim 1, wherein the boundary portion of the circlip-restricting part is closer to the rotational axis of the shaft section than the contact portion of the circlip-restricting part, even when eccentricity of the circlip from the rotational axis of the shaft section in a radial direction of the shaft section is maximized under a condition that the circlip is in the female-spline-side annular groove.

8. The propeller shaft as claimed in claim 1, wherein the second inclined portion of the circlip-restricting part has a straight shape in a longitudinal sectional view along the axial direction of the shaft section.

9. The propeller shaft as claimed in claim 1, wherein the second inclined portion of the circlip-restricting part has a rounded shape projecting toward the male-spline-side annular groove in a longitudinal sectional view along the axial direction of the shaft section.

10. The propeller shaft as claimed in claim 1, wherein the first inclined portion and the second inclined portion of the circlip-restricting part are formed simultaneously by a single processing tool.

\* \* \* \* \*